US009866459B1

(12) United States Patent
Joliveau et al.

(10) Patent No.: US 9,866,459 B1
(45) Date of Patent: Jan. 9, 2018

(54) ORIGIN FAILOVER FOR LIVE STREAMING

(71) Applicant: Amazon Technologies, Inc., Seattle, WA (US)

(72) Inventors: Marc Joliveau, Seattle, WA (US); Kenneth Thomas Burford, Seattle, WA (US); Elliot Fanwar George, Seattle, WA (US); Kyle Bradley Koceski, Seattle, WA (US); Paul Simon Nann, Seattle, WA (US); Stefan Christian Richter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 189 days.

(21) Appl. No.: 15/061,890

(22) Filed: Mar. 4, 2016

(51) Int. Cl.
| | | |
|---|---|---|
| *G06F 15/173* | (2006.01) | |
| *H04L 12/26* | (2006.01) | |
| *H04L 29/06* | (2006.01) | |
| *H04L 12/24* | (2006.01) | |
| *H04L 12/707* | (2013.01) | |

(52) U.S. Cl.
CPC ...... *H04L 43/0823* (2013.01); *H04L 41/0654* (2013.01); *H04L 45/22* (2013.01); *H04L 65/4069* (2013.01)

(58) Field of Classification Search
USPC ....... 709/203, 206, 217, 219, 223, 224, 226, 709/228, 231, 232, 238; 707/632; 711/147; 725/29; 382/240
See application file for complete search history.

(56) References Cited

U.S. PATENT DOCUMENTS

| | | | | |
|---|---|---|---|---|
| 8,595,186 | B1 * | 11/2013 | Mandyam | G06F 8/38 |
| | | | | 707/632 |
| 2006/0023962 | A1 * | 2/2006 | Hwang | H04N 19/647 |
| | | | | 382/240 |
| 2007/0171921 | A1 * | 7/2007 | Wookey | G06F 3/1415 |
| | | | | 370/401 |
| 2009/0287886 | A1 * | 11/2009 | Karstens | G06F 9/44557 |
| | | | | 711/147 |
| 2010/0100899 | A1 * | 4/2010 | Bradbury | H04N 7/17318 |
| | | | | 725/29 |
| 2012/0311174 | A1 * | 12/2012 | Bichot | H04N 21/44209 |
| | | | | 709/231 |
| 2015/0271232 | A1 * | 9/2015 | Luby | H04L 65/4084 |
| | | | | 709/231 |
| 2016/0269765 | A1 * | 9/2016 | Mandyam | H04N 21/2541 |

\* cited by examiner

*Primary Examiner* — Quang N Nguyen
(74) *Attorney, Agent, or Firm* — Weaver Austin Villeneuve & Sampson LLP

(57) ABSTRACT

Techniques are described for automatically migrating client devices away from unreliable origin stacks in ways that mitigate potentially negative impacts on the user experience. Multiple origin stacks are provisioned in parallel to provide encoded versions of the same broadcast content for streaming to client devices. Each of the origin stacks is monitored to ensure that it is operating correctly. When an origin stack fails or becomes unreliable, each of the client devices involved in a session corresponding to the unreliable stack is provided with the information it needs to establish a new session corresponding to another one of the stacks.

24 Claims, 4 Drawing Sheets

ORIGIN FAILOVER FOR LIVE STREAMING

BACKGROUND

Live streaming content, also referred to as broadcast content, includes channels or feeds with scheduled content (e.g., premium movie channels) as well as live broadcasts (e.g., sporting events, news, etc.). Unlike video-on-demand (VOD) content, broadcast content may not have a distinct end point and may continue indefinitely. In addition, VOD content may be buffered or otherwise stored in client devices well in advance of the client playhead (i.e., the content fragment currently being rendered by the client). This is typically not the case for broadcast content because of the fact that the delay between the live playhead (i.e., the latest content fragment available) and the client playhead may be only a few seconds, as well as the fact that the broadcast content is often generated in real time and therefore may not yet exist.

An origin stack is the set of transcoding, digital rights management (DRM), and media processing hardware and software resources that generates encoded content from a broadcast content source for streaming to client devices. Multiple origin stacks for the same content may be provisioned for redundancy and load balancing purposes. If one of the stacks fails, all of the sessions relying on that stack need to reacquire streams originating from a different stack. The typically short amount of time between the live and client playheads, and the number of client devices that may be consuming streams originating from a particular origin stack make such failovers technically challenging.

DETAILED DESCRIPTION

This disclosure describes techniques for automatically migrating client devices away from unreliable origin stacks in ways that mitigate potentially negative impacts on the user experience. Multiple origin stacks are provisioned in parallel to provide encoded versions of the same broadcast content for streaming to client devices. These stacks are typically isolated from each other in some way, e.g., different hardware, different data centers, different geographic locations, etc. Each of the origin stacks is monitored to ensure that it is operating correctly. When an origin stack fails or becomes unreliable, no new sessions corresponding to that stack are allowed to be established. In addition, each of the client devices involved in a session corresponding to the unreliable stack is provided with the information it needs to establish a new session corresponding to another one of the stacks. An example may be instructive.

Figure 1A:
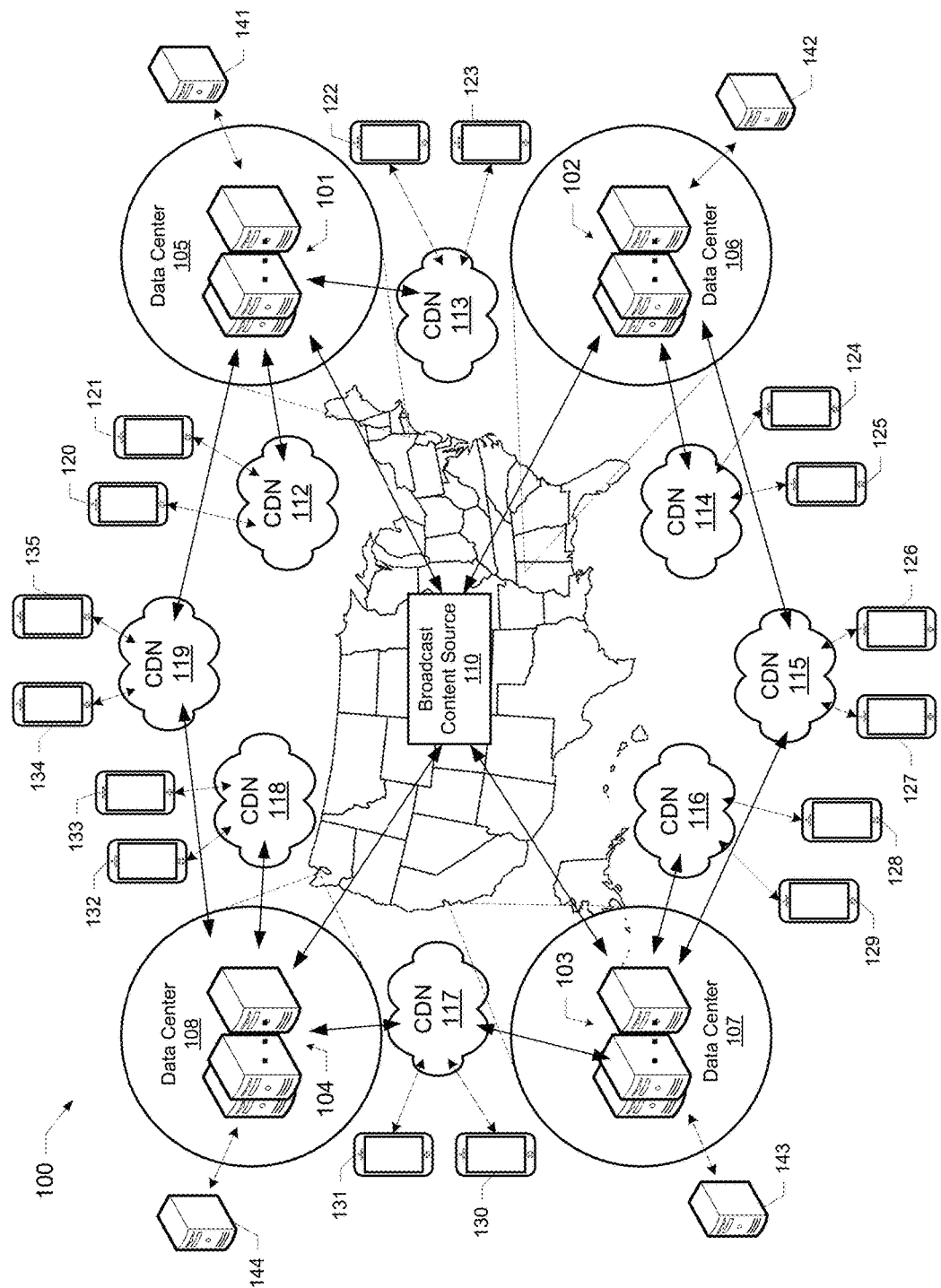
FIGS. 1A and 1B illustrate origin stack failover according to a particular implementation.

FIG. 1A shows a distributed content delivery service 100 in which multiple origin stacks 101-104 are provisioned in data centers 105-108 on the east and west coasts of the United States. Each of the origin stacks receives broadcast content from a broadcast content source 110, encodes the content, and provides the encoded content to one or more content delivery networks (CDNs) 112-119) that, in turn, stream the encoded broadcast content to client devices 120-135. A monitoring client (141-144) monitors the operation of each of the origin stacks.

Each monitoring client may be, for example, a software module that mimics at least some of the functionalities of a media player on a client device (e.g., it doesn't necessarily need to be able to fully render and display the content). In the depicted example, monitoring client 141 acquires a stream of the encoded broadcast content as generated by origin stack 101. If an error occurs during acquisition, decoding, or "playback" of the broadcast content by monitoring client 141, an error message is sent to the content delivery service which prevents any new sessions corresponding to origin stack 101 from being established, and provides client devices engaged in existing sessions corresponding to origin stack 101 (e.g., client devices 120-123) with the information required to establish a new session for the same content with one or more of the other origin stacks, e.g., a uniform resource locator (URL) for a network end point from which the content can be streamed, any necessary DRM licenses, a manifest file, etc.

Figure 1B:
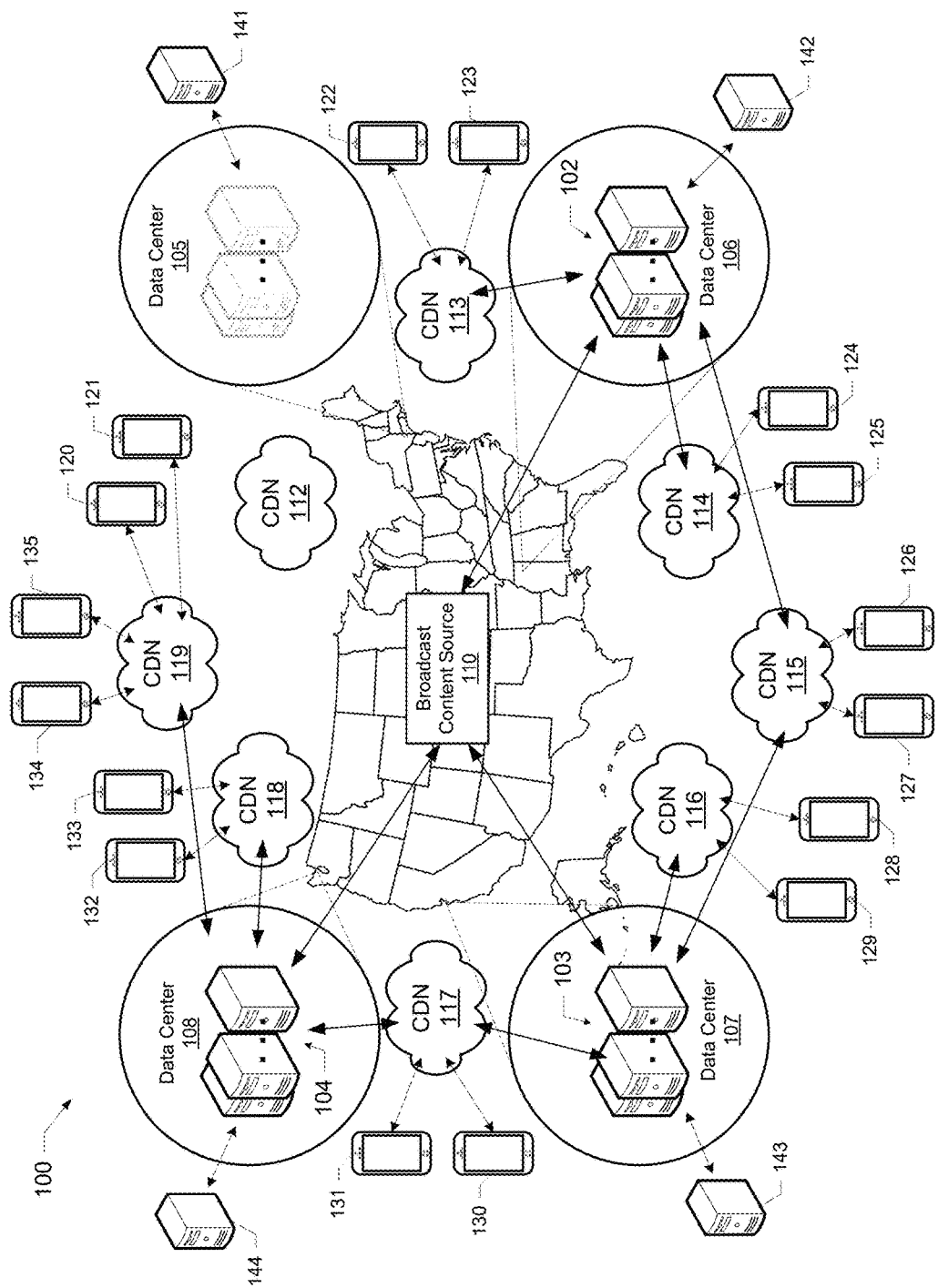

A possible result of such a migration is illustrated in FIG. 1B in which client devices 120 and 121 are redirected from CDN 112 to CDN 119 which streams the content from origin stack 104. By contrast, client devices 122 and 123 establish new sessions with the same CDN 113 but for content streams that now originate from origin stack 102. As will be appreciated by those of skill in the art, there is a wide range of variations by which sessions associated with an unreliable origin stack may be reestablished. More importantly, because of the close monitoring of the operation of each origin stack, the automatic failover of sessions from one origin stack to another may be done in a way that significantly reduces the impact on the user experience.

Figure 2:
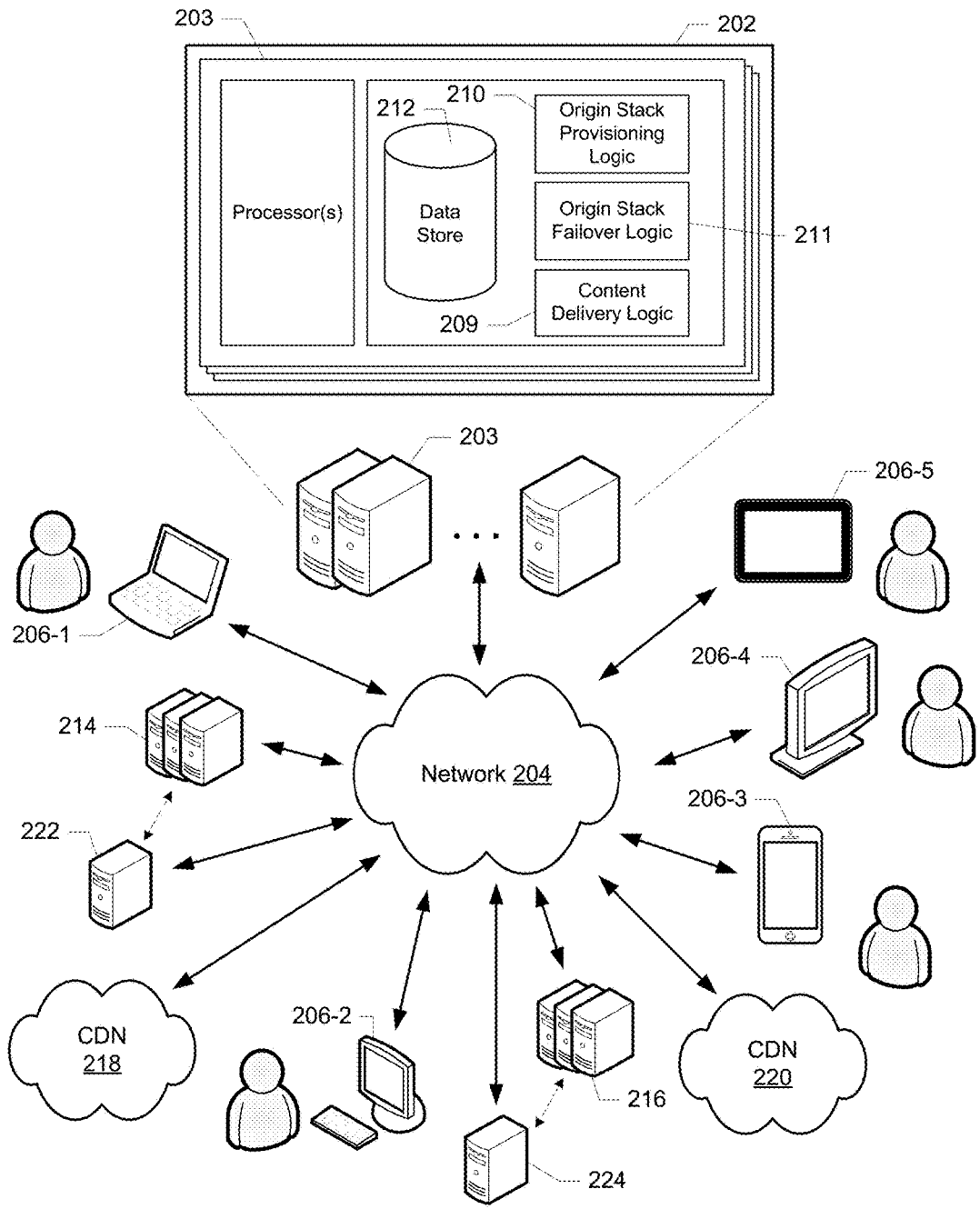
FIG. 2 is a simplified diagram of a computing environment in which various implementations may be practiced.

FIG. 2 illustrates an example of a computing environment in which a video content service 202 provides live streaming content (e.g., audio or video) via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 206 may be any suitable device capable of connecting to network 204 and consuming live streaming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

At least some of the examples described herein contemplate implementations based on computing models that enable ubiquitous, convenient, on-demand network access to a shared pool of computing resources (e.g., networks, servers, storage, applications, and services) to provision origin stacks and provide streaming content. As will be understood, such computing resources may be integrated with and/or under the control of the same entity, e.g., the entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols, encryption techniques, or DRM systems herein are merely by way of example. Suitable alternatives known to those of skill in the art may be employed.

In some of the examples herein, content service 202 is described as providing access to broadcast content using multiple, redundant origin stacks (e.g., origin stacks 214 and 216) in conjunction with one or more content delivery networks (e.g., CDNs 218 and 220) that may or may not be independent of content service 202. As will be appreciated, content service 202 may be integrated to varying degrees with the platforms and/or networks in which the origin stack resources and/or CDNs operate. For example, one or more origin stacks may be integrated with or in the same co-location facility or data center as content service 202. Alternatively, origin stacks may be in facilities that are remote from that in which content service 202 operates. In another example, an origin stack may be in the same network or facility as a CDN that is streaming its content. The range of variations known to those of skill in the art are contemplated to be within the scope of this disclosure.

Content service 202 includes logic that facilitates at least some aspects of the delivery of live streaming content to client (e.g., as represented by content delivery logic 209). Content service 202 also includes logic that facilitates the provisioning of origin stacks (e.g., logic 210) and origin stack failover (e.g., logic 211). In addition to these functions, content service 202 may also include a variety of information related to the live streaming content (e.g., associated metadata and manifest files) in data store 212 to which service 202 provides access. Alternatively, such information about the live streaming content, as well as the live streaming content itself may be provided and/or hosted by one or more separate platforms, e.g., CDNs 218 and 220. It should be noted that, while logic 210 and 211, and data store 212 are contemplated as integrated with content service 202, implementations are contemplated in which either or both operate remotely from the associated content service. From these examples, those of skill in the art will understand the diversity of use cases to which the techniques described herein are applicable.

Each origin stack has an associated monitoring client (e.g., monitoring client 222 for origin stack 214 or monitoring client 224 for origin stack 216. A monitoring client is preferably in closer communication with its origin stack than the client devices accessing the broadcast content as this would allow time for migration of existing sessions to another origin stack; hopefully with the effect of mitigating the impact on the user experience. For example, the monitoring client could be operating within the same data center as its origin stack and/or in direct or very close communication with the stack (as indicated by the dashed arrows in FIG. 2).

However, it should be noted that implementations are contemplated in which the monitoring client monitors its origin stack in a variety of ways. For example, the monitoring client could be deployed in a CDN, or even be receiving its stream of the encoded broadcast content from a CDN in a manner similar to end user client devices. Implementations are also contemplated in which the monitoring client may derive its information representing the operation of its origin stack by accumulating event messages from the client devices engaged in sessions corresponding to its stack. The scope of this disclosure should therefore not be limited with reference to particular implementations of monitoring clients.

Figure 3:
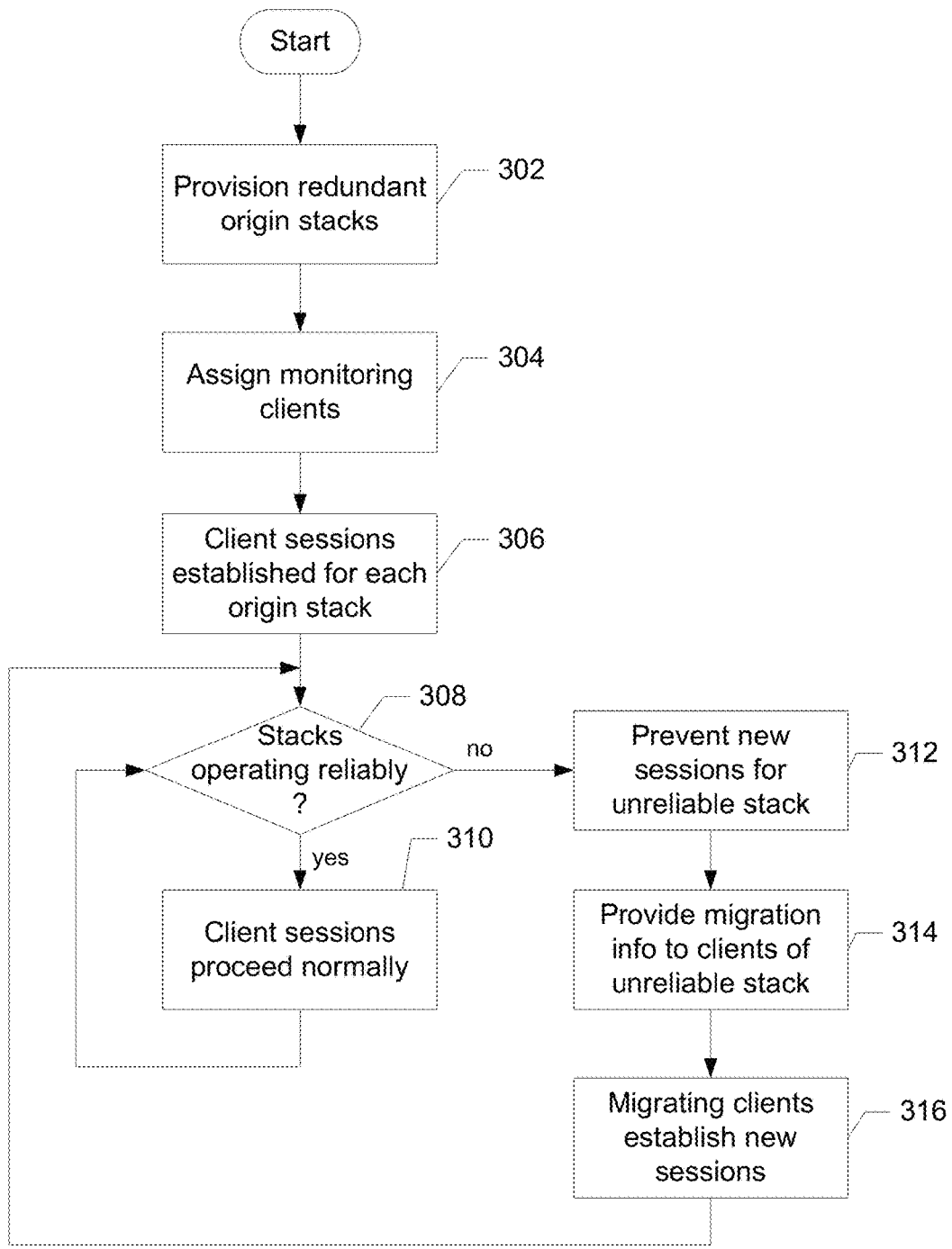
FIG. 3 is a flowchart illustrating operation of a particular implementation.

The delivery of live streaming content according to a particular implementation is illustrated in the flow chart of FIG. 3. This and other examples described herein assume the use of H.265 (also commonly referred to as HEVC) encoding for broadcast content. However, it will be understood that the basic principles described herein may be employed with any of a variety of video and audio codecs and streaming technologies including, for example, Dynamic Adaptive Streaming over HTTP (MPEG-DASH), HTTP Dynamic Streaming, HTTP Live Streaming (HLS), Smooth Streaming, H.264, MPEG-1, MPEG-2, MPEG-4 Part 2, VC-1, H.263, VP8, VP9, and Daala.

And when a user wants to connect with a content service using a client device, the connection is typically achieved through some kind of login process to the service in a user interface presented on the client device. Content playback is provided, for example, via a resident media player, web browser, or mobile app. Access to content over the Internet is typically governed by a DRM system such as Google's Widevine, Microsoft's PlayReady, Apple's FairPlay, or Sony's OpenMG to name a few representative examples. Live streaming content is typically delivered in an encrypted stream using any of a variety of encryption technologies including, for example, various Advanced Encryption Standard (AES) and Elliptic Curve Cryptography (ECC) encryption techniques. It should be noted that the techniques described herein are compatible with a wide range of content services, media players, DRM systems, and encryption technologies, the details of which are known to those of skill in the art. The nature and operation of these technologies will therefore not be described in detail to promote clarity.

In preparation for the streaming of particular broadcast content, a content service provisions (e.g., using origin stack provisioning logic 210) multiple, redundant origin stacks (302), each of which includes the necessary set of transcoding, digital rights management (DRM), and media processing hardware and software resources for encoding content from a broadcast content source and making the encoded content available for streaming to client devices (e.g., via one or more CDNs). The origin stacks are preferably isolated from each other to some degree (e.g., different hardware, co-location facilities, geographic regions, etc.) to ensure reliable delivery of the broadcast content.

The content service also provisions or assigns a monitoring client instance to each of the origin stacks (304). As discussed above, a monitoring client monitors the operation of its origin stack to determine whether the stack is operating reliably. A monitoring client may take a variety of forms depending on the particular implementation. For example, the monitoring client may be implemented as an enhanced or modified version of a media player with functionalities that are similar or even substantially identical to those being used by the client devices to access the broadcast content. Such a monitoring client might not need all of the functionality of the media player to which it is similar (e.g., it may not be required to fully render the content for display), but might have similar playback error detection logic to determine whether an error has occurred in the acquisition, decoding, and/or playback of the broadcast content. Such errors might include, for example, slow responses (e.g., the content URLs are slow or non-responsive), corrupted responses (e.g., the data are not in an expected format or content is lost or corrupted), audio and video are not synchronized, subtitle corruption or synchronization problems, etc. Many of the errors that may be detected by a media player may be used. The monitoring client might also include enhancements that allow it to make decisions about how to handle any detected errors, e.g., logic that determines whether and how to notify the content service depending on the type, severity, and/or combination of errors detected.

The monitoring client may also be augmented relative to a typical media player to acquire information regarding the health status of its origin stack or any of the stack's components. For example, the monitoring client could repeatedly ping each or a subset of the hardware and/or software resources of its stack regarding its operational status. The monitoring client might also request more specific information from stack components such as, for example, whether any encoding or decoding errors have occurred, signal presence and/or signal quality for the broadcast source, CPU usage, memory usage, network utilization, etc. Any of a wide variety of metrics representative of the health of any stack component or the fidelity of the received or encoded content may be used. Alternatively, a monitoring client might be implemented completely differently from a media player, receiving and/or requesting events and updates from its origin stack in any of a wide variety of ways.

In some cases, there may be more than one monitoring client for an origin stack. This kind of redundancy might be useful to ensure that the information about the reliability of a particular origin stack is, itself, reliable. For example, a notification to the content service regarding the health of an origin stack might not be sent unless its associated monitoring clients agree as to its status. Regardless of how the monitoring clients are configured or the types of information they acquire, the monitoring client(s) for each stack communicate(s) with the content service (e.g., origin stack failover logic 211) regarding the reliability of the corresponding origin stack.

Referring back to FIG. 3, client devices establish sessions in which each client device streams the encoded broadcast content originating from one of the origin stacks (306). As discussed above, this may be accomplished via intervening CDNs which receive the encoded broadcast content from the origin stacks. Each client device sends a request to the content service to connect to the broadcast content. The content service provides information to the client device for establishing a session including, for example, a uniform resource locator (URL) for a network end point from which the content can be streamed, any necessary DRM licenses, manifest data identifying available content fragments, content metadata, etc. The information provided to the client device also includes a decryption key with which the client can decode the encrypted video fragments of the stream. The client device then uses that information to connect with and begin consumption of the broadcast content.

While each origin stack is determined to be operating reliably (308), e.g., as determined by the respective monitoring clients, the existing sessions corresponding to each origin stack are allowed to proceed normally (310). On the other hand, if the content service (e.g., logic 211) receives a notification from one of the monitoring clients that its origin stack is unreliable (308), it prevents any new sessions from being initiated for the unreliable stack (312). This might involve, for example, the content service removing the unreliable stack from its list of available origin stacks. The content service also provides each of the client devices corresponding to the unreliable stack with the information (e.g., DRM licenses, new decryption key, manifest) required to establish a new session for the broadcast content with another one of the origin stacks (314). These clients then establish new sessions that rely on another one of the stacks (316).

According to various implementations, the determination as to whether an origin stack is operating reliably and/or the measure(s) of reliability may vary considerably. As mentioned above, such a determination might be based on the output of media player error detection logic indicating one or more errors in the acquisition, decoding, and/or playback of the broadcast content. Such a determination might also be based on errors in the reported operational status of the stack and/or its components. The determination that the stack is unreliable might be triggered in response to one such error, multiple errors within a certain time period, an error rate, etc. And the manner in which the determination is triggered within any given implementation may vary based on the nature and/or severity of the error or the combination of errors. In another example, a stack might be determined to be unreliable only where a complete failure has been detected, e.g., responses are not received to requests for content fragments, stack components are reported as down, etc. In another example in which the stack reliability determination relies at least in part on errors reported by end user client devices, a stack might be determined to be unreliable when a threshold number or percentage of the client devices report errors. Further variations will be apparent to those of skill in the art.

According to various implementations, the manner in which migration of clients occurs in response to a determination that an origin stack is operating unreliably may also vary considerably. For example, in response to a notification that a particular origin stack is unreliable, the content service might send a notification to each of the client devices engaged in sessions relying on that stack that they need to terminate their current sessions and establish new sessions, with the responsibility being on the client device to begin reacquiring the content. Alternatively, the content service might send such notifications with everything each of the client devices needs (DRM info, encryption key, manifest data, etc.) to establish the new session.

And the new sessions may be established in a variety of ways. For example, a particular CDN is streaming broadcast content from multiple origin stacks, some client devices associated with a failed origin stack might migrate to another origin stack within the same CDN while others might migrate to another origin stack associated with a different CDN. In another example, if a CDN is streaming broadcast content from only one origin stack and that stack fails, the content service can provide the content from another one of the origin stacks to that CDN so that at least some of the client devices streaming the content from that CDN can establish new sessions for the content with the same CDN, while others might migrate to a different CDN.

As mentioned above, it may be desirable to mitigate any negative impact on the user experience due to the migration of client devices resulting from the failure of an origin stack. If the determination that an origin stack is operating unreliably can be made very close in time to the live playhead and/or sufficiently far ahead of the client playhead(s), the likelihood that negative impacts can be mitigated or even eliminated is increased.

In some implementations, and depending on the nature of the origin stack failure, it may be possible to identify transition points in the broadcast content at which playback in new sessions for migrating client devices should begin. That is, if the content service knows the point in the content at which acquisition of content fragments originating from a particular stack is no longer reliable, it can identify a playback transition point in the content that is ahead of that point, and communicate that playback transition point to client devices which can then transition from playback of their initial sessions to their new sessions at the transition point before they experience the effect of the stack failure.

According to some implementations, such a transition point may be determined and/or selected to reduce or eliminate the perceptibility of the transition between streams from the viewer's perspective. The nature of the transition point may depend on the type of content. A transition point might be determined or derived using information about the content that is provided by the content provider. For example, content providers often provide information (e.g., content stream metadata) about events or breaks in content (e.g., commercial breaks, breaks between blocks of content, beginning or end of scheduled content, beginning of important live content, etc.) that may present suitable opportunities for making the transition. Such events or breaks might include a fade to black, a few black frames, or content that is less important to viewers (e.g., credits). Black frames can be particularly advantageous for a transition to a new content stream in that they are likely to be visually indistinguishable from one stream to the other even when offset in time. And in the event such a transition results in a buffering event, the buffering animation typically presented on the device display can be suppressed to reduce the likelihood that the transition would be perceptible (i.e., because the black frames are indistinguishable).

In some cases where there is sufficient time between the live playhead and at least some of the client playheads, multiple transition points may be identified and provided to different subsets of client devices to distribute the computational load associated with transitioning a population of client devices to other origin stacks. That is, rather than attempting to migrate all of the client devices associated with the unreliable stack at the same time, the computational load can be spread out over a period of time (e.g., seconds or even minutes in some cases) by providing transition point options for different subsets of the client devices that correspond to different points in the content.

The nature of such transition point information and the manner in which it is provided may vary considerably. For example, it may be delivered at the time the client is acquiring the new content stream, in a separate (e.g., sideband) communication after streaming of the new content begins, in playback details associated with the current content stream, etc. It may be expressed in terms of the local time in the geographic area of the client, an internal time reference of the client, time stamps or indices associated with the content, etc. It might also be a communicated with the trigger or notification sent to the client that acquisition of a new content stream should begin.

According to some implementations, the playback transition may be specified in terms of and/or effected based on content fragment indices. That is, both content streams correspond to the same underlying broadcast content which is typically acquired as a sequence of content fragments requested by the client. The playback transition from one stream to the other could therefore be done by initiating playback of the n+1 fragment of the second stream immediately following the nth fragment of the first. Implementations are also contemplated that take a more granular approach in which the transition may be specified at or effected based on the Group of Pictures (GOP) unit within a fragment.

According to some implementations, a less precise approach to effecting the transition can be employed rather than using consecutive fragments or GOPs. For example, if the transition point corresponds to a relatively long segment (e.g., 3 seconds) of black frames, playback of the second content stream can be initiated further along in the sequence of fragments or GOPs than the point at which playback of the first content stream is terminated. In another example, if the transition point corresponds to an advertisement, the entire ad could be skipped or even replaced, with playback of the second stream beginning at an appropriate point to enable that.

According to some implementations, the occurrence of visual artifacts or buffering events that might otherwise be associated with switching playback from one stream to another can be mitigated by beginning playback of the second stream such that one or more fragments, GOPs, or frames from the first stream are repeated. That is, if it is determined that transition at a particular transition point is likely to cause such an event, or if one actually occurs, playback of the second stream can be initiated at a point that corresponds to a point in the first stream prior to the point at which playback of the first stream was terminated. In that case, while the transition will likely be perceptible, the viewer is not missing any of the content.

As discussed above, the available options for playback transition points may be high-confidence transition points such as, for example, commercial breaks, credits, fades/cuts to black, or the beginnings or ends of content blocks. These are high-confidence in that they increase the likelihood that the transition will not be visually perceptible and there may also be a relatively high degree of reliability in the timing of such events as identified by the content provider. Alternatively, identification of suitable transition points may be based on real-time or near-real-time video inspection and analysis, identifying upcoming transition points that may only be seconds in the future. For example, video fragments, GOPs, and individual video frames can be analyzed to determine whether they are black frames, or correspond to scenes in which the display images do not appreciably change for an extended period of time. As should be appreciated, such an approach may be particularly important for broadcast content that is generated shortly before the live playhead, e.g., live concerts or sporting events.

According to some implementations, a client device transitioning from one origin stack to another does not need to receive or acquire new manifest data to make the transition. Instead, the content service provides the client device with a new base address path for the URLs in the client's existing manifest data; the new base address path corresponding to a different origin stack than the stack from which the client device has been requesting fragments. The client device can then continue to request fragments using the same manifest data (but with the new base path). Assuming the encoding of the broadcast content by the different origin stacks is sufficiently synchronized, the migration of a client device from one origin stack to another can be done seamlessly.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
    provisioning a plurality of origin stacks, each origin stack including a set of computing resources configured to receive broadcast content, and encode the broadcast content;
    for each origin stack, generating one or more streams of the encoded broadcast content for consumption by a corresponding plurality of client devices;
    providing first manifest information to a first client device, the first manifest information being configured to enable the first client device to access a first stream of the encoded broadcast content originating from a first origin stack;
    providing the first stream of the encoded broadcast content to the first client device;
    monitoring each of the origin stacks to determine whether each of the origin stacks is reliably generating the corresponding one or more streams of the encoded broadcast content;
    determining that the first origin stack is not reliably generating the corresponding one or more streams of the encoded broadcast content;
    in response to determining that the first origin stack is not reliably generating the corresponding one or more streams of the encoded broadcast content, providing second manifest information to the first client device, the second manifest information being configured to enable the first client device to transition to a second stream of the encoded broadcast content originating from a second origin stack; and
    providing the second stream of the encoded broadcast content to the first client device such that presentation of the broadcast content on the first client device is substantially uninterrupted.

2. The method of claim 1, wherein providing the first stream of the encoded broadcast content to the first client device is done via a first content distribution network in communication with the first origin stack, and wherein providing the second stream of the encoded broadcast content to the first client device is done via the first content distribution network in communication with the second origin stack or via a second content distribution network in communication with the second origin stack.

3. The method of claim 1, wherein monitoring each of the origin stacks includes, for each origin stack, acquiring one of the corresponding one or more streams of the encoded broadcast content with a monitoring client operating in a same data center with the origin stack.

4. The method of claim 3, wherein the monitoring client associated with each origin stack includes playback error detection logic configured to generate event messages representing playback errors, and wherein determining that the first origin stack is not reliably generating the corresponding one or more streams of the encoded broadcast content includes receiving a first event message representing a first playback error from a first monitoring client associated with the first origin stack.

5. A system, comprising one or more computing devices configured to:
    provision a plurality of origin stacks, each origin stack including a set of computing resources configured to encode broadcast content;
    for each origin stack, generate one or more streams of the encoded broadcast content for consumption by a corresponding plurality of client devices;
    provide first manifest information to a first client device, the first manifest information being configured to enable the first client device to access a first stream of the encoded broadcast content originating from a first origin stack;
    provide the first stream of the encoded broadcast content to the first client device;
    monitor each of the origin stacks to determine whether each of the origin stacks is reliably generating the corresponding one or more streams of the encoded broadcast content;
    determine that the first origin stack is not reliably generating the corresponding one or more streams of the encoded broadcast content; and
    in response to determining that the first origin stack is not reliably generating the corresponding one or more streams of the encoded broadcast content, migrate the plurality of client devices corresponding to the first origin stack to one or more of the other origin stacks, wherein migration of the plurality of client devices includes providing second manifest information to the first client device, the second manifest information being configured to enable the first client device to transition to a second stream of the encoded broadcast content originating from a second origin stack.

6. The system of claim 5, wherein the one or more computing devices are further configured to provide a first stream of the encoded broadcast content to a first client device via a first content distribution network in communication with the first origin stack, and wherein the one or more computing devices are configured to migrate the plurality of client devices corresponding to the first origin stack to one or more of the other origin stacks, in part, by providing a second stream of the encoded broadcast content to the first client device via the first content distribution network in communication with a second origin stack or via a second content distribution network in communication with the second origin stack.

7. The system of claim 5, wherein the one or more computing devices are configured to monitor each of the origin stacks by, for each origin stack, acquiring one of the corresponding one or more streams of the encoded broadcast content with a monitoring client operating in a same data center with the origin stack.

8. The system of claim 7, wherein the monitoring client associated with each origin stack includes playback error detection logic configured to generate event messages representing playback errors, and wherein the one or more computing devices are configured to determine that the first origin stack is not reliably generating the corresponding one or more streams of the encoded broadcast content by receiving a first event message representing a first playback error from a first monitoring client associated with the first origin stack.

9. The system of claim 5, wherein the one or more computing devices are configured to migrate the plurality of client devices corresponding to the first origin stack to one or more of the other origin stacks, in part, by providing first transition information to the first client device, the first transition information representing a first transition point in the broadcast content for transitioning playback of the broadcast content away from the first stream of the encoded broadcast content to the second stream of the encoded broadcast.

10. The system of claim 9, wherein the one or more computing devices are further configured to migrate the plurality of client devices corresponding to the first origin stack to one or more of the other origin stacks, in part, by providing second transition information to a second client device, the second transition information representing a second transition point in the broadcast content for transitioning playback of the broadcast content, the second transition point being different from the first transition point.

11. The system of claim 5, wherein the one or more computing devices are configured to monitor each of the origin stacks by, for each origin stack, repeatedly requesting health status information from at least one of the computing resources associated with the origin stack.

12. The system of claim 5, wherein the one or more computing devices are configured to migrate the plurality of client devices corresponding to the first origin stack to one or more of the other origin stacks, in part, by notifying the client devices corresponding to the first origin stack that they need to acquire a new stream of the encoded broadcast content.

13. The system of claim 5, wherein the one or more computing devices are configured to determine that a first origin stack is not reliably generating the corresponding one or more streams of the encoded broadcast content by determining that the first origin stack stopped generating the one or more streams, determining that one of the computing resources of the first origin stack has failed, determining that one of the computing resources of the first origin stack is exhibiting unhealthy CPU usage, memory usage, or network utilization, determining that a signal from a source of the broadcast content is of poor quality or is not being received, determining that uniform resource locators associated with the one or more streams are slow or non-responsive, determining that data included in the one or more streams is not in an expected format, determining that content associated with the one or more streams has been lost or corrupted, or determining that components of the content associated with the one or more streams are not synchronized.

14. The system of claim 5, wherein the one or more computing devices are further configured to provide manifest information to a first client device, the manifest information being configured, in combination with first base address information, to enable the first client device to request fragments of the encoded broadcast content originating from a first origin stack, and wherein the one or more computing devices are configured to migrate the plurality of client devices corresponding to the first origin stack to one or more of the other origin stacks, in part, by providing second base address information to the first client device, the second based address information being configured, in combination with the manifest information, to enable the first client device to request fragments of the encoded broadcast content originating from a second origin stack.

15. A computer-implemented method, comprising:
provisioning a plurality of origin stacks, each origin stack including a set of computing resources configured to encode broadcast content;
for each origin stack, generating one or more streams of the encoded broadcast content for consumption by a corresponding plurality of client devices;
providing first manifest information to a first client device, the first manifest information being configured to enable the first client device to access a first stream of the encoded broadcast content originating from a first origin stack;
providing the first stream of the encoded broadcast content to the first client device;
monitoring each of the origin stacks to determine whether each of the origin stacks is reliably generating the corresponding one or more streams of the encoded broadcast content;
determining that the first origin stack is not reliably generating the corresponding one or more streams of the encoded broadcast content; and
in response to determining that the first origin stack is not reliably generating the corresponding one or more streams of the encoded broadcast content, migrating the plurality of client devices corresponding to the first origin stack to one or more of the other origin stacks, wherein migrating the plurality of client devices includes providing second manifest information to the first client device, the second manifest information being configured to enable the first client device to transition to a second stream of the encoded broadcast content originating from a second origin stack.

16. The method of claim 15, further comprising providing a first stream of the encoded broadcast content to a first client device via a first content distribution network in communication with the first origin stack, wherein migrating the plurality of client devices corresponding to the first origin stack to one or more of the other origin stacks includes providing a second stream of the encoded broadcast content to the first client device via the first content distribution network in communication with a second origin stack or via a second content distribution network in communication with the second origin stack.

17. The method of claim 15, wherein monitoring each of the origin stacks includes, for each origin stack, acquiring one of the corresponding one or more streams of the encoded broadcast content with a monitoring client operating in a same data center with the origin stack.

18. The method of claim 17, wherein the monitoring client associated with each origin stack includes playback error detection logic configured to generate event messages representing playback errors, and wherein determining that the first origin stack is not reliably generating the corresponding one or more streams of the encoded broadcast content includes receiving a first event message representing a first playback error from a first monitoring client associated with the first origin stack.

19. The method of claim 15, further comprising providing transition information to the first client device, the transition information representing a transition point in the broadcast content for transitioning playback of the broadcast content away from the first stream of the encoded broadcast content to the second stream of the encoded broadcast.

20. The method of claim 19, further comprising providing second transition information to a second client device, the second transition information representing a second transition point in the broadcast content for transitioning playback of the broadcast content, the second transition point being different from the first transition point.

21. The method of claim 15, wherein monitoring each of the origin stacks includes, for each origin stack, repeatedly requesting health status information from at least one of the computing resources associated with the origin stack.

22. The method of claim 15, wherein migrating the plurality of client devices corresponding to the first origin stack to one or more of the other origin stacks includes notifying the client devices corresponding to the first origin stack that they need to acquire a new stream of the encoded broadcast content.

23. The method of claim 15, wherein determining that a first origin stack is not reliably generating the corresponding one or more streams of the encoded broadcast content includes determining that the first origin stack stopped generating the one or more streams, determining that one of the computing resources of the first origin stack has failed, determining that one of the computing resources of the first origin stack is exhibiting unhealthy CPU usage, memory usage, or network utilization, determining that a signal from a source of the broadcast content is of poor quality or is not being received, determining that uniform resource locators associated with the one or more streams are slow or non-responsive, determining that data included in the one or more streams is not in an expected format, determining that content associated with the one or more streams has been lost or corrupted, or determining that components of the content associated with the one or more streams are not synchronized.

24. The method of claim 15, further comprising providing manifest information to a first client device, the manifest information being configured, in combination with first base address information, to enable the first client device to request fragments of the encoded broadcast content originating from a first origin stack, and wherein migrating the plurality of client devices corresponding to the first origin stack to one or more of the other origin stacks includes providing second base address information to the first client device, the second based address information being configured, in combination with the manifest information, to enable the first client device to request fragments of the encoded broadcast content originating from a second origin stack.

* * * * *